United States Patent [19]
Ohsawa

[11] Patent Number: 5,500,708
[45] Date of Patent: Mar. 19, 1996

[54] FOCUS DETECTION DEVICE HAVING INFRARED FILTER

[75] Inventor: Keiji Ohsawa, Tokyo, Japan

[73] Assignee: Nikon Corporation, Tokyo, Japan

[21] Appl. No.: 325,569

[22] Filed: Oct. 19, 1994

[30] Foreign Application Priority Data

Oct. 19, 1993 [JP] Japan ................................. 5-260571

[51] Int. Cl.$^6$ ........................................... G03B 3/00
[52] U.S. Cl. ........................ 354/406; 354/407; 354/408; 250/201.1
[58] Field of Search ................................ 354/406, 407, 354/408; 250/201

[56] References Cited

U.S. PATENT DOCUMENTS 4,634,255 1/1987 Suda et al. ........................ 354/406
4,843,227 6/1989 Matsui et al. ........................ 250/201

FOREIGN PATENT DOCUMENTS 60-28720   2/1985  Japan .
60-263912 12/1985 Japan .
4-422      1/1992  Japan .

Primary Examiner—Michael L. Gellner
Assistant Examiner—Eric Nelson
Attorney, Agent, or Firm—Oliff & Berridge

[57] ABSTRACT

A focus detection device includes an infrared reduction filter positioned behind the field lens between, the field lens and any secondary imaging lenses. Preferably, the infrared reduction filter is positioned closely adjacent to the field lens, i.e., closer to the field lens than to the secondary imaging lenses, usually between the field lens and any deflection mirror that might be located between the field lens and the secondary imaging lenses.

23 Claims, 6 Drawing Sheets

FOCUS DETECTION DEVICE HAVING INFRARED FILTER

BACKGROUND OF THE INVENTION

1. Field of the Invention

The present invention relates to a focus detection device having an infrared filter positioned in a focus detection system for blocking undesired light such as infrared light. The focus detection device can be used in cameras, or similar apparatus.

2. Description of Related Art

FIG. 7 depicts a conventional focus detection device. Light rays pass through different regions of the imaging lens 1 and form an image at a predetermined focusing plane FP after passing through a half transparent mirror 2 and a completely reflective auxiliary mirror 3. The light rays pass through a view field mask 4, a field lens 5, a deflection mirror 6 and a pair of diaphragm masks 7 containing an opening. A pair of secondary imaging lenses 8 form the light rays into images on a pair of photo sensors 9a and 9b located at a secondary focusing plane. The focusing state of the imaging lens 1 can be detected by detecting the difference in phase between the secondary images using the output of the photo sensors. The photo sensors are housed in a single package 9 and produce a focus detection signal as is known. See, for example, U.S. Pat. No. 4,634,255, the disclosure of which is incorporated herein by reference. In addition, the light rays used in focus detection are deflected by a deflection mirror 6. The light rays are deflected such that the secondary imaging lenses 8 and the photo sensor package 9 can be efficiently positioned in the camera body without increasing the camera body size.

The photo sensors typically include photoelectric elements (for example, charge-coupled-devices (CCD)) having a peak spectral sensitivity in the long wavelength region of infrared rays. A filter is necessary to reduce the amount of light in the infrared region to compensate for the relative sensitivity of the human eye. Infrared reduction filters can be divided into two categories, absorption filters and reflective filters. Absorption filters present spatial problems when used in the focus detection module of a camera or similar apparatus. These filters may be thick due to the amount of glass needed to form the base plate, however, a camera is generally small in size. In addition, the wavelength cutting properties of these absorption filters are not sharp. Consequently, reflective infrared reduction filters made from multiple film layers coated on a glass base plate are generally used in the focus detection modules.

The focus detection device disclosed in Japanese Laid-Open Patent Application No. 60-263912 uses a reflective infrared reduction filter 10 (See FIG. 7) positioned between the field lens 5 and the view field mask 4 (i.e., on the front surface of field lens 5). FIG. 4 depicts a focus detection device forming secondary images on the photo sensors 9a and 9b. The projection position of the opening of the diaphragm mask of the focus detection device onto the imaging lens (position I in FIG. 4) is 100–200 mm from the predetermined focusing plane FP. The distance from the predetermined focusing plane FP to the secondary imaging plane on the photo sensors 9a and 9b is at most several dozen millimeters because it is desirable for the focus detection device to be compact. The angle Θ1 at the front surface of the field lens 5 is the smallest of the maximum angles of incidence Θ1–Θ3 made on the imaging plane by the primary light rays at focus detection optical paths 21 and 22.

The transparency of a reflective infrared reduction filter changes dramatically with the angle of incidence. When the filter is arranged at a large angle of incidence, the spectrum distribution of an image deviates from the actual distribution and the intensity of light is diminished. This causes a reduction in detection precision. As a result, it is beneficial to have an arrangement in which the angle of incidence of the light rays is small, preferably not more than 10°. The reflective infrared reduction filter in Japanese Laid-Open Patent Application No. 60-263912 is located at the front surface of the field lens 5 because the smallest angle of incidence is located at the front surface of the field lens 5.

As shown in FIG. 7, there is some separation between the field lens 5 and the predetermined focusing plane FP of the imaging (e.g., photographic) lens. The position of the predetermined focusing plane FP is determined by the position of the auxiliary mirror 3 relative to the film surface. The distance between the predetermined focusing plane FP and the auxiliary mirror 3 should correspond to the distance between the auxiliary mirror 3 and the film surface F. For example, if the auxiliary mirror is moved toward the imaging lens 1 (as shown in dotted lines in FIG. 7), then the predetermined focusing plane FP must move downward while moving in a direction toward the imaging lens 1.

The movement of the auxiliary mirror 3 toward the imaging lens 1 is limited such that the auxiliary mirror 3 will cover all of the light rays necessary for distance measurement used in focus detection. If the mirror is moved too closely to the imaging lens (as shown in dotted lines 3-1 in FIG. 7), then some light rays will not be reflected by the auxiliary mirror 3 leading to an inaccurate distance measurement and improper focusing. The predetermined focusing plane FP is positioned slightly above the bottom B of the mirror box to accommodate some movement of the auxiliary mirror 3. However, it is ideal to have the view field mask 4 in the same position as the predetermined focusing plane FP, but because the focus detection module cannot protrude into the mirror box from the bottom B of the mirror box, there is some separation d between the predetermined focusing plane FP and the field lens 5.

Reflective infrared reduction filters are formed by vaporizing electrically conductive layers of film on a glass base plate. Stress is applied to the glass base plate by the thin film during vaporization. If the glass base plate is too thin, cracks may result from the applied stress during vaporization. Japanese Laid-Open Patent Application No. 4-422 discloses a multi-AF (auto-focus) optical system. Focus detection is performed in a plurality of areas on the screen. However, problems arise when a filter is used with this optical system. FIG. 5 shows the fundamental arrangement of a multi-AF optical system. With this optical system, distance measurements are simultaneously possible at several locations including areas a, b, c and d. This type of focus detection optical system requires a larger field lens 5. When an infrared reduction filter is positioned in front of the field lens 5, the surface area of the filter naturally must be increased as well. Because the strength of a reflective type filter having a large surface area is weaker under the stress applied by the film during vaporization than is a filter having a small surface area, it is necessary to use a thicker glass base plate than in a filter having a small surface area. Accordingly, the separation d referred to above between the predetermined focusing plane FP and the field lens 5 is increased by the thickness of the infrared reduction filter positioned between them. This further separates the field lens 5 from the predetermined focusing plane FP.

Increasing the distance between the field lens 5 and the predetermined focusing plane FP creates problems, discussed in reference to FIG. 6. Assuming the separation d between the predetermined focusing plane FP and the field lens 5 has increased by the amount δ1, the light rays 23 and 24 which pass through the boundary of the distance measurement range R on the predetermined focusing plane FP are spread as they pass through the opening of the view field mask 4. The spread of the light rays 23 and 24 when they are incident on the field lens 5 becomes larger as the separation between the predetermined focusing plane FP and the field lens 5 becomes larger. As a result, it becomes necessary to increase the effective surface of the field lens 5 to a similar degree, as shown for example in dotted lines 5-1 in FIG. 6. This increases the size of the focus detection module.

In addition, the light rays 23 and 24 are from different regions on the screen. The field lens 5 must be optically designed with aberration compensation to cope with these different regions. However, lens design becomes difficult as the light rays spread and the spread at the time of incidence on the field lens 5 increases. In particular, when the field lens 5 is in position 5-1 there is a region where the two light rays 23 and 24 overlap (region K indicated by the diagonal lines in FIG. 6). The design of a lens that can cope with the aberrations of the light rays in this region becomes impossible, and the optical properties of the lens become inferior to that of a lens used for cases where the light rays have not spread.

Furthermore, as the separation between the predetermined focusing plane FP and the field lens 5 increases from d to d+δ1, it is necessary to also increase the separation L1 between the field lens 5 and the secondary imaging lenses 8 and the separation L2 between the secondary imaging lenses 8 and the photo sensor package 9 to maintain the same secondary imaging magnification and optical properties. The increases in the lengths are denoted as δ2 and δ3. The total distance from the predetermined focusing plane FP to the photo sensor package 9 becomes δ1+δ2+δ3 longer than the total distance d+L1+L2. This increases the size of the focus detection module.

SUMMARY OF THE INVENTION

It is an object of embodiments of the present invention to provide a focus detection device with an infrared reduction filter to eliminate the problems identified in the previous devices.

It is a further object of embodiments of the present invention to provide a focus detection device with an infrared reduction filter for use in a device such as a camera or similar apparatus having an imaging lens that forms an image at a predetermined focusing plane. The focus detection device has a field lens positioned near the predetermined focusing plane. At least one pair of secondary imaging lenses is provided for forming light rays that pass through the field lens into images at a secondary focusing plane. An infrared reduction filter is positioned between the field lens and the at least one pair of secondary imaging lenses, adjacent to the field lens and reduces the amount of infrared light rays on the at least one pair of secondary imaging lenses. Light rays entering through the photographic lens travel sequentially through the field lens, the infrared reduction filter and the secondary imaging lenses. The secondary imaging lenses form the light rays into images on light sensing devices, such as, for example, photo sensors.

It is also possible to provide a deflection mirror positioned between the infrared reduction filter and the at least one pair of secondary imaging lenses.

It is also possible to provide a focus detection device having an infrared reduction filter with a cover glass to prevent contaminants from adhering to the surface of the field lens. The cover glass is positioned adjacent to the field lens between the field lens and the predetermined focusing plane. The thickness of the infrared reduction filter is greater than the thickness of the cover glass.

A method of reducing infrared light in a focus detection device is also disclosed. The method includes placing an infrared reduction filter within the focus detection device between the field lens and at least one pair of secondary imaging lenses adjacent to the field lens.

With the embodiments of the present invention, the reflective infrared reduction filter is positioned behind the field lens. The infrared reduction filter is positioned without increasing the separation between the predetermined focusing plane and the field lens. As a result, the size of the focus detection device is not increased.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
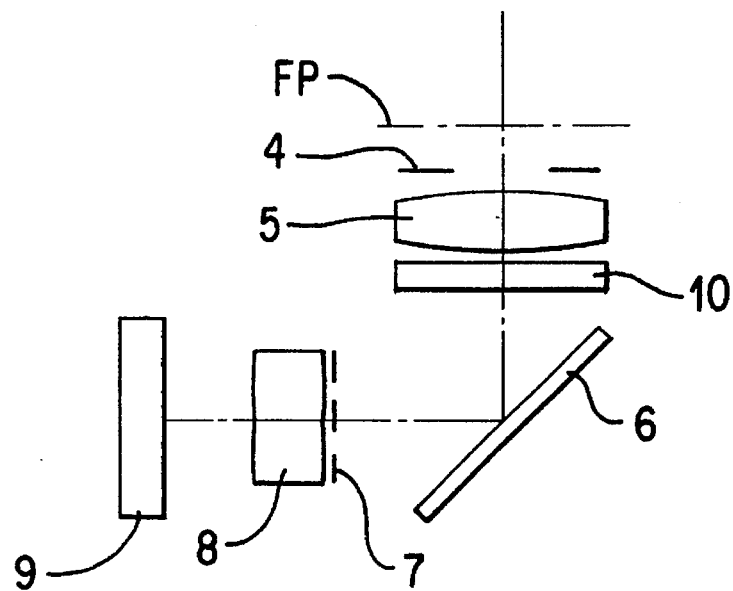
FIG. 1 is a cross section showing the structure of a focus detection device according to a first embodiment of the present invention.

FIG. 1 depicts a first embodiment of the present invention. The focus detection device includes an infrared reduction filter 10 positioned behind the field lens 5 (i.e., between the field lens 5 and the deflection mirror 6). When the filter is located in this position, it is possible for the infrared reduction filter 10 to have a sufficient thickness to prevent the formation of cracks during film vaporization without increasing the separation between predetermined focusing plane FP and the field lens 5. The infrared reduction filter 10 of embodiments of the present invention can be formed from glass or plastic. Furthermore, it is possible to increase the surface area of the infrared reduction filter 10. In addition, in this position the angle of incidence of focus detection light rays is not a minimum, in contrast to positioning the filter on the front side (the side toward the subject) of the field lens 5, but it is possible to design a focus detection optical system in which the angle of incidence is not greater than 10°. Accordingly, the effectiveness of the reflective infrared reduction filter is not adversely affected.

Figure 2:
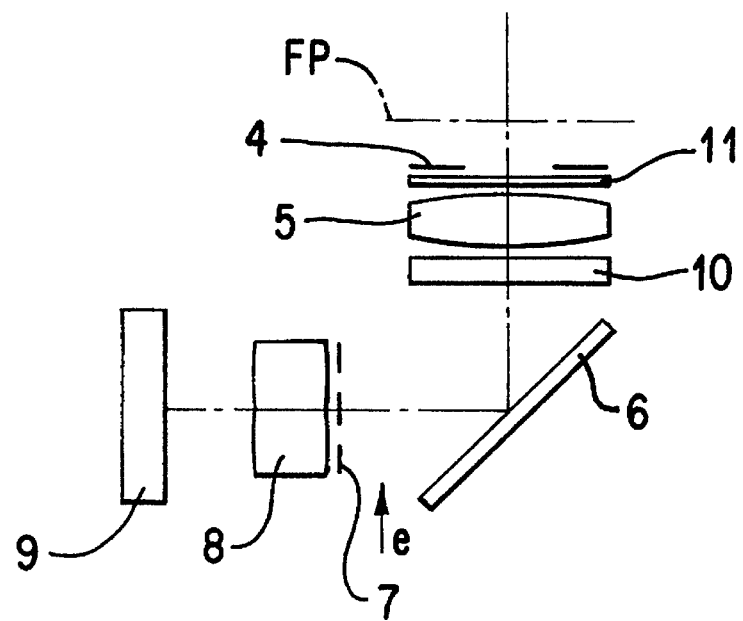
FIG. 2 is a cross section showing the structure of a focus detection device according to a second embodiment of the present invention.

FIG. 2 depicts a second embodiment of the present invention. The positioning of the infrared reduction filter 10 is the same as with the first embodiment. This embodiment further includes a cover glass 11 positioned between the field lens 5 and the view field mask 4 which is located to the front of the field lens 5. The cover glass 11 is provided to prevent dust and the like from adhering to the surface of the field lens 5. The presence of dust and the like on the field lens 5 can impair focus detection precision. The cover glass 11 is made of very thin glass. Therefore, the increase in separation between the predetermined focusing plane FP and the field lens 5 caused by the placement of the cover glass 11 is extremely small. As a result, the negative effects described above in other devices are essentially non-existent.

Figure 3:
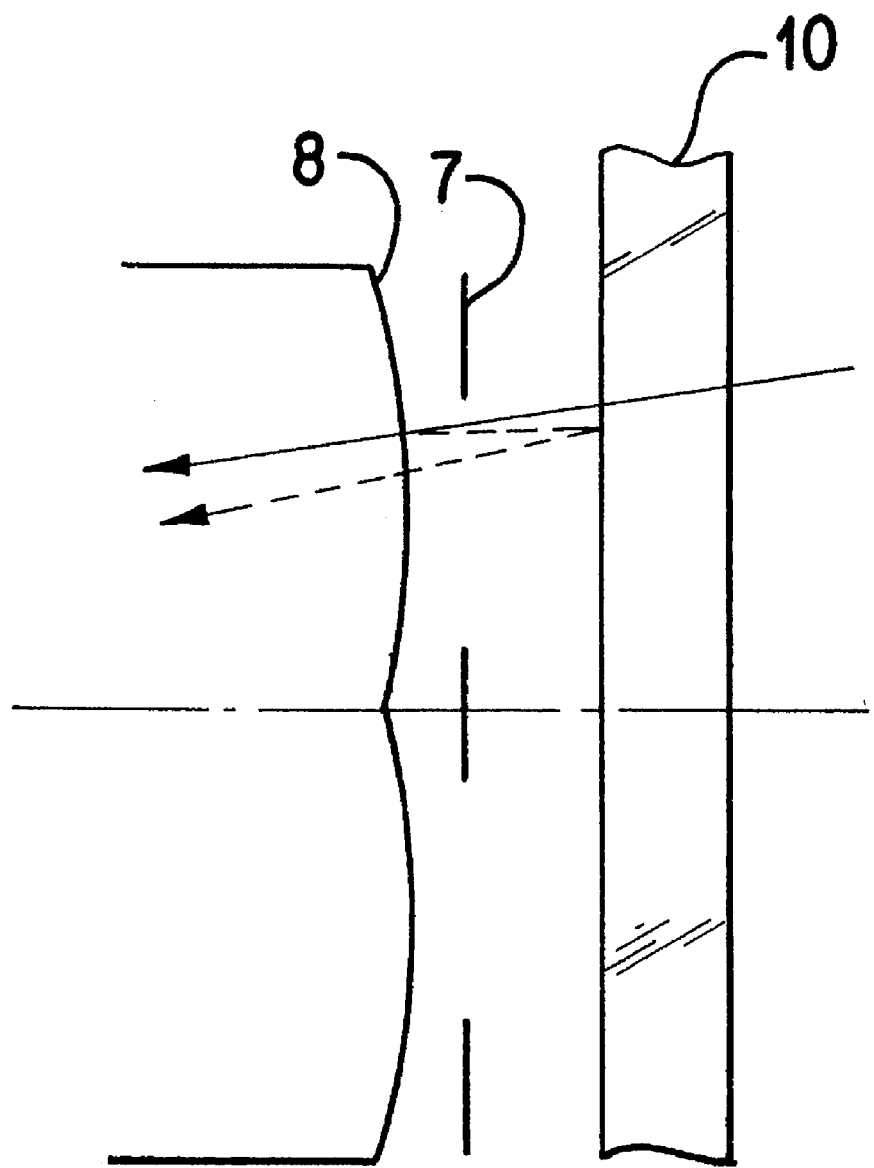
FIG. 3 illustrates the optical path of stray light.
Figure 4:
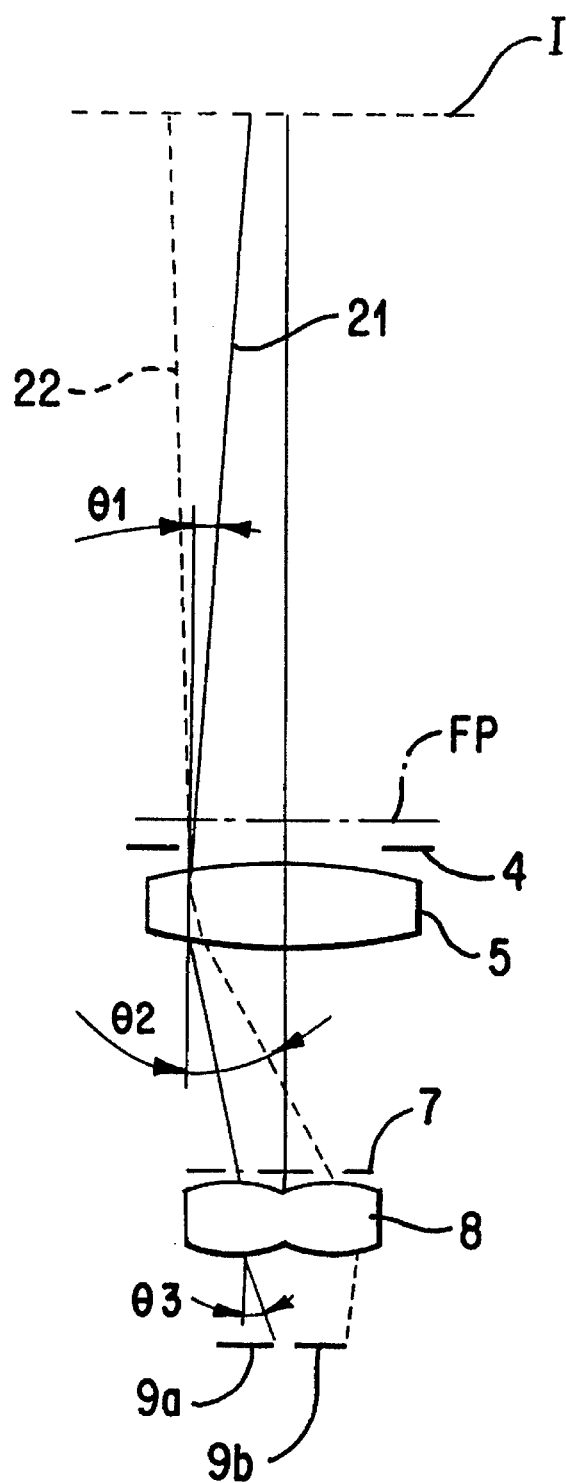
FIG. 4 depicts the optical path of the primary light rays in a focus detection optical system.
Figure 5:
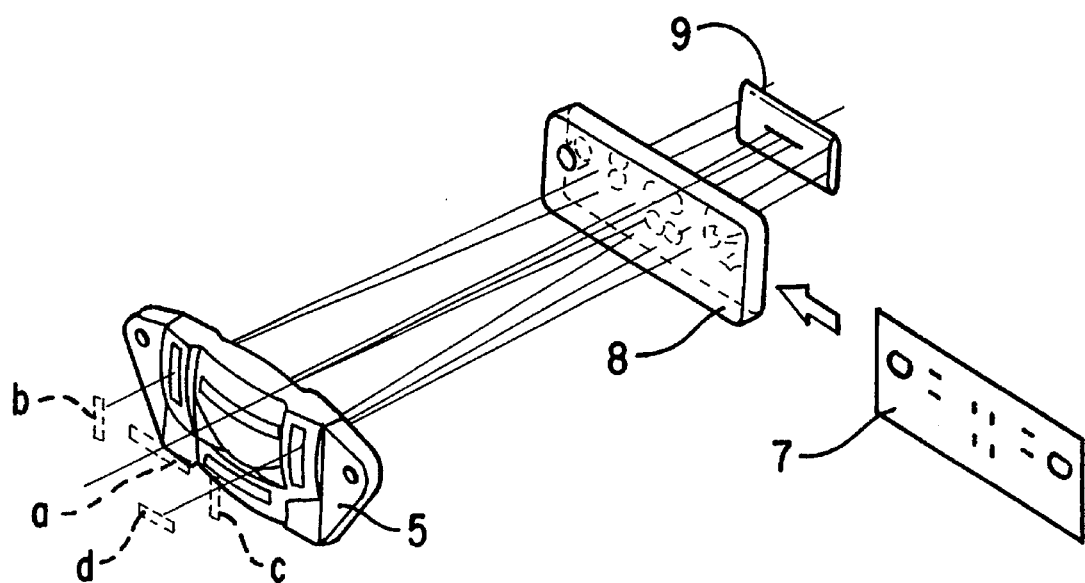
FIG. 5 shows the structure of a multi-AF optical system.
Figure 6:
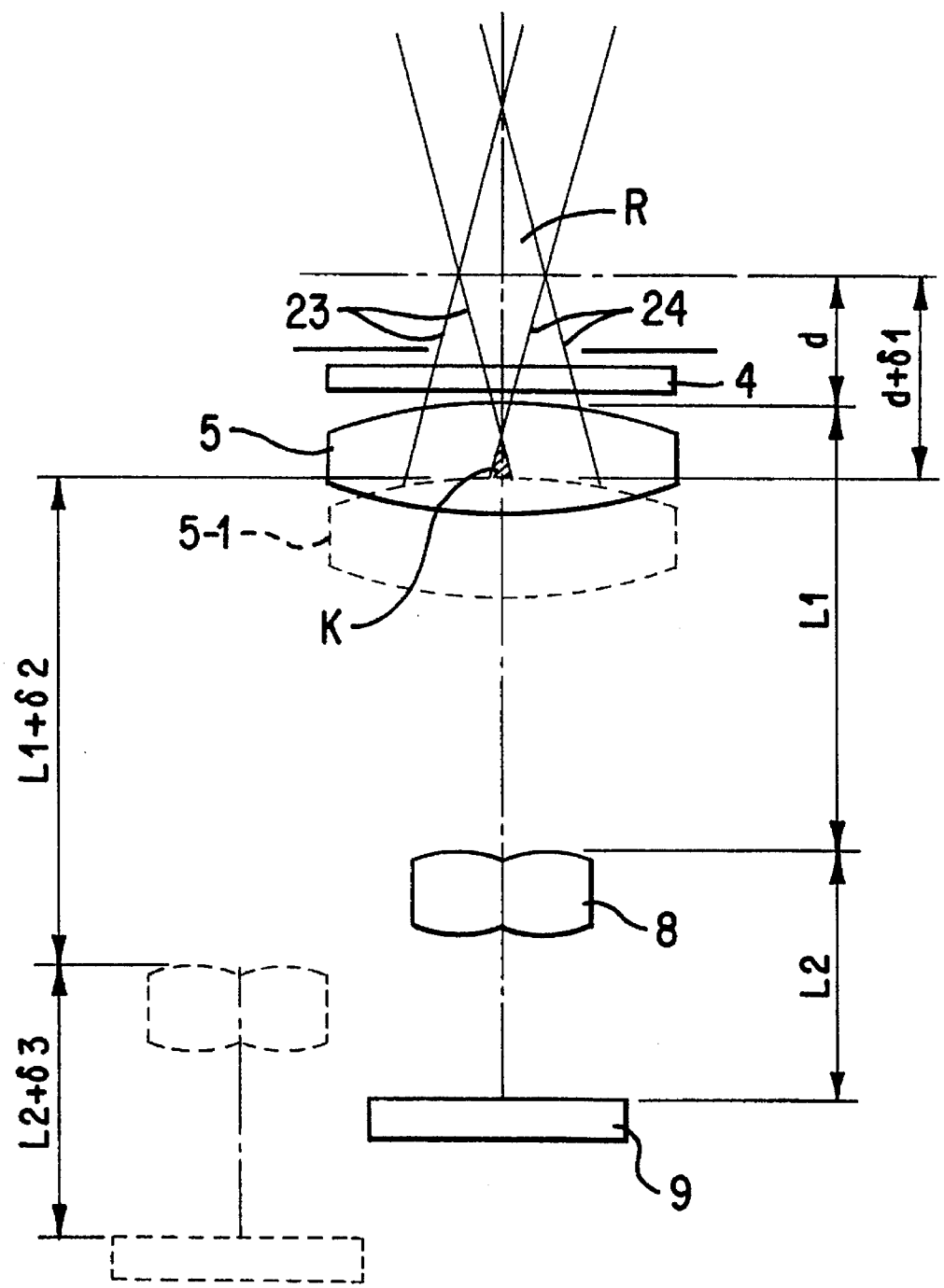
FIG. 6 depicts the relationship between the lenses in a focus detection optical system and the optical path.
Figure 7:
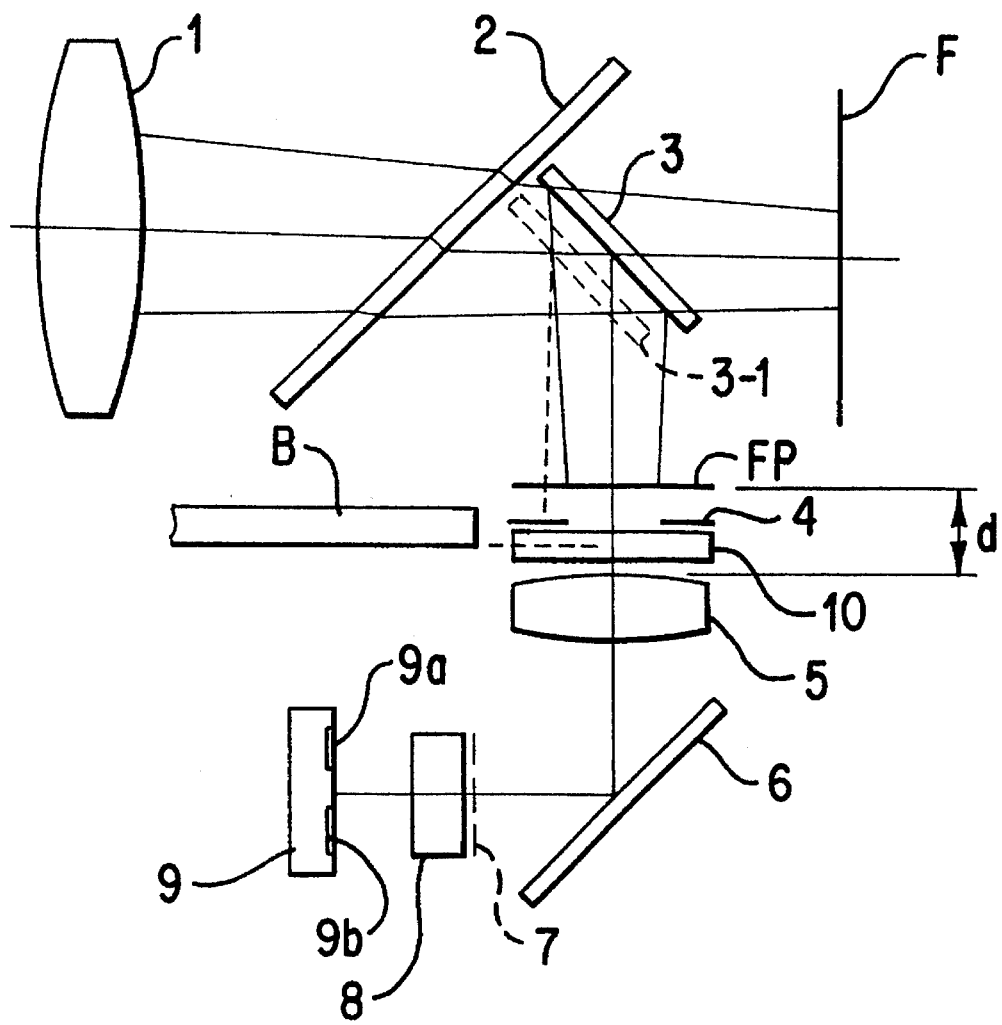
FIG. 7 is a cross section showing the structure of a conventional focus detection device.

An alternative position (position e in FIG. 2) for the infrared reduction filter 10, which does not affect the positioning of the field lens 5, is considered in Japanese Laid-Open Patent Application No. 60-28720. While the benefit of this position lies in the fact that an infrared reduction filter with a smaller surface area can be used, this position produces the following problem. The front of each secondary imaging lens 8 (the side toward the field lens) is normally a flat surface or a curved surface having an extremely small curvature (a flat surface is used in Japanese Laid-Open Patent Application No. 60-28720). Consequently, the back of the infrared reduction filter 10 is positioned very close to a parallel flat surface or a roughly parallel, slightly curved surface. Harmful light (shown by the dotted line in FIG. 3) is reflected by the front surface of the secondary imaging lens 8 and reflected again toward the secondary imaging lens 8 by the back surface of the infrared reduction filter 10. This reflected light travels in essentially the same direction as the true focus detection light and arrives at nearly the same position on the line sensor. This produces a negative effect in terms of the precision of focus detection. This does not occur when the infrared reduction filter 10 is positioned adjacent to the back surface of the field lens 5 (as discussed in embodiments of the present invention) because the back surface of the field lens 5 normally has a large curvature. The light reflected by the front surface of the infrared reduction filter 10 is reflected by the back surface of the field lens 5 in a direction different than the true optical path and does not reach the light receiving surface of the line sensor 9. As a result, this reflected light does not have a negative effect on the precision of focus detection.

Thus, unlike Japanese Laid-Open Application No. 60-28720, with the present invention, the infrared reduction filter 10 is located closer to the field lens 5 than to the secondary imaging lenses 8, preferably closely adjacent to the field lens 5. In particular, the infrared reduction filter is located between the field lens 5 and the deflection mirror 6, which is provided between the field lens 5 and the secondary imaging lenses 8.

Furthermore, in the multi-AF system (described above) having an optical system that divides the optical path of light into various distance measurement areas, a plurality of filters are needed when the filter is positioned in front of the secondary imaging lenses (at position e) because the optical path has been divided. This duplication of filters is not necessary when the filter is positioned immediately behind the field lens. A single filter will suffice even if the optical path is divided after the light has passed through the field lens.

With the present invention, as described above, an infrared reduction filter having a certain degree of thickness can be positioned without having a negative effect on the performance of the focus detection optical system. Hence, it is possible to provide a focus detection device equipped with an infrared reduction filter that can sufficiently cope with the division of the optical path and enlargement of the field lens accompanying an increase in the number of focus detection areas, such as with multi-AF and similar apparatus.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed:

1. A focus detection device that detects focus using light rays transmitted through an imaging lens having a predetermined focusing plane, said focus detection device comprising:

a field lens positioned near said predetermined focusing plane;

at least one pair of secondary imaging lenses;

an infrared reduction filter that reduces infrared light rays, said infrared reduction filter being positioned between said field lens and said at least one pair of secondary imaging lenses, said infrared reduction filter located closer to said field lens than to said at least one pair of secondary lenses; and a photo sensor, wherein the light rays transmitted through said imaging lens travel sequentially through said field lens, said infrared reduction filter and said at least one pair of secondary imaging lenses, whereby said at least one pair of secondary imaging lenses forms said light rays into images on said photo sensor.

2. A focus detection device according to claim 1, wherein said photo sensor is a charge-coupled-device.

3. A focus detection device according to claim 1, wherein said photo sensor includes at least one pair of rows of photoelectric elements.

4. A focus detection device according to claim 1, further comprising an optical path light deflection device that deflects said light rays used in focus detection, said optical path light deflection device located between said field lens and said at least one pair of secondary imaging lenses.

5. A focus detection device according to claim 4, wherein said optical path light deflection device is a deflection mirror.

6. A focus detection device according to claim 4, wherein said infrared reduction filter is positioned between said optical path light deflection device and said field lens.

7. A focus detection device according to claim 5, wherein said infrared reduction filter is positioned between said deflection mirror and said field lens.

8. A focus detection device according to claim wherein said infrared reduction filter is a reflective infrared reduction filter.

9. A focus detection device according to claim 8, wherein said reflective infrared reduction filter includes a glass substrate.

10. A focus detection device according to claim 8, wherein said reflective infrared reduction filter includes a plastic substrate.

11. A focus detection device according to claim further comprising a cover glass positioned adjacent said field lens between said field lens and said predetermined focusing plane.

12. A focus detection device according to claim 1, wherein said infrared reduction filter has a first thickness and said cover glass has a second thickness, said second thickness being less than said first thickness.

13. A camera comprising:

a photographic lens that transmits light rays to a predetermined focusing plane;

a field lens positioned near said predetermined focusing plane;

imaging means for forming light rays that pass through said field lens into images at a secondary imaging plane;

filtering means for reducing infrared light from the light rays transmitted to said imaging means, said filtering means being positioned between said field lens and said imaging means, said filtering means located closer to said field lens than to said imaging means; and sensing means for producing a focus detection signal from the image produced by said imaging means.

14. The camera according to claim 13, further comprising an optical path deflection means for deflecting said light rays, said optical path deflection means located between said field lens and said imaging means.

15. The camera according to claim 14, wherein said filtering means is positioned between said optical path deflection means and said field lens.

16. The camera according to claim 13, wherein said filtering means includes an infrared reduction filter.

17. The camera according to claim 16, wherein said infrared reduction filter is a reflective infrared reduction filter.

18. The camera according to claim 13, further comprising a transparent cover means between said photographic lens and said field lens for preventing dust from adhering to said field lens.

19. The camera according to claim 18, wherein said cover means includes a glass plate positioned adjacent said field lens between said field lens and said predetermined focusing plane.

20. The camera according to claim 19, wherein said filtering means has a first thickness and said glass plate has a second thickness, said second thickness being less than said first thickness.

21. A method of reducing infrared light in a focus detection device having a field lens, at least one pair of secondary imaging lenses and a photo sensor, wherein light rays entering said focus detection device travel through said field lens and said at least one pair of secondary imaging lenses, said at least one pair of secondary imaging lenses forming said light rays into an image on said photo sensor, said method comprising:

placing an infrared reduction filter within said focus detection device between said field lens and said at least one pair of secondary imaging lenses so that said infrared reduction filter is closer to said field lens than to said at least one pair of secondary imaging lenses.

22. The method of claim 21, wherein said focus detection device includes a deflection mirror positioned between said field lens and said at least one pair of secondary imaging lenses, and said infrared reduction filter is placed between said field lens and said deflection mirror.

23. The method of claim 21, further comprising the step of placing a transparent plate adjacent said field lens on a side of said field lens opposite to said infrared reduction filter.

* * * * *